Figure 1:
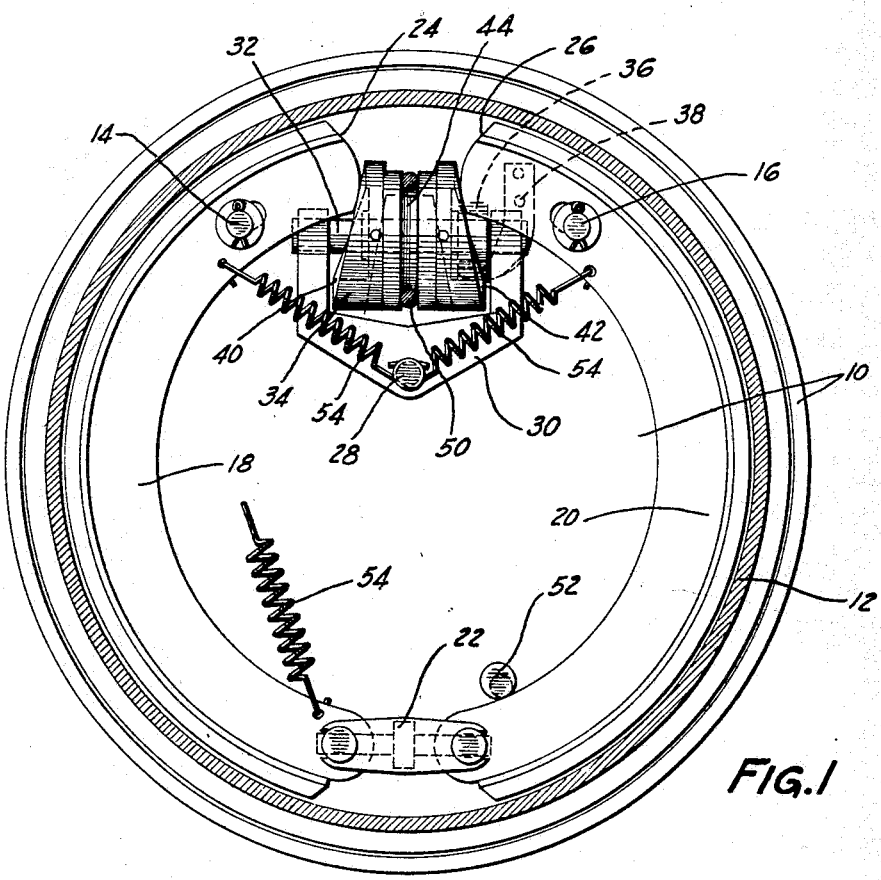

Oct. 9, 1934.  E. V. TAYLOR  1,976,420

BRAKE

Filed July 26, 1930

INVENTOR.
EUGENE V. TAYLOR
BY  M. W. McConkey
ATTORNEY

Patented Oct. 9, 1934

1,976,420

UNITED STATES PATENT OFFICE 1,976,420

BRAKE

Eugene V. Taylor, Chicago, Ill., assignor to Bendix Brake Company, South Bend, Ind., a corporation of Illinois Application July 26, 1930, Serial No. 470,796

10 Claims. (Cl. 188—78)

This invention relates to brakes and more particularly to internal expanding brakes.

An object of the invention is to provide an operating means for the friction element of an internal expanding brake.

Another object of the invention is to provide an operating means for the friction elements of a brake characterized by an increase in leverage in proportion to the rate movement of the friction elements.

Another object of the invention is to provide an operating means for the friction elements of a brake having means for equalizing the pressure applied to the friction elements.

A further object of the invention is to provide an operating member for the friction element of a brake having a variable leverage cooperating with a variable actuating member so arranged that the leverage is increased proportionately to the distance traveled by the actuating member, so that pressure on the friction elements is greatest when most needed.

A salient feature of the invention is a variable cam which provides a quick take-up with little movement of the operating cable when the brake is applied and which will increase the leverage when the pressure on the friction element is most needed.

A further feature of the invention is to provide a brake operating member or means which is positive, highly efficient in operation, and yet of marked simplicity as a whole in respect to each of its component parts, so that its manufacturer may be economically facilitated both as regards to parts and their assembly.

Figure 2:
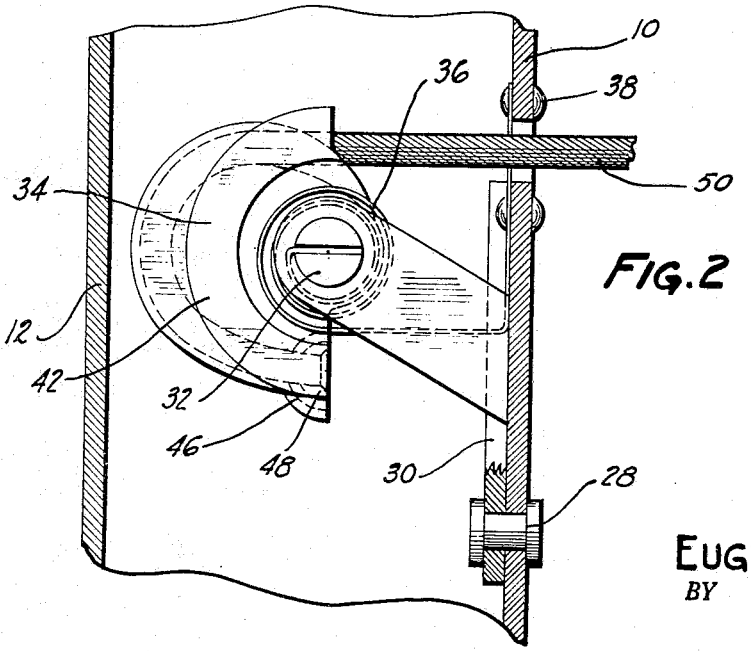

Other objects and advantages of the invention will appear from the following description taken in connection with the drawing which forms a part of this specification, and in which:

Figure 1 is a sectional view of a brake taken just back of the head of the drum illustrating the friction elements and operating mechanism in elevation; and Figure 2 is a side elevation of the operating means.

Referring to the drawing for more specific details of the invention, 10 represents a fixed support such as a backing plate and 12 a rotatable drum associated therewith. Positioned on the backing plate are suitable steady rests 14 and 16. Friction members 18 and 20 are positioned for movement on the backing plate and secured against displacement by the steady rests 14 and 16. As shown, these members are connected at their articulated ends by a suitable adjusting device 22 and their separable ends are provided with rounded shoulders 24 and 26, the object of which will be hereinafter explained.

Pivoted on the backing plate as by a bolt 28 is a yoke 30 supporting a rotatable shaft 32 to which is pinned or otherwise secured a variable cam 34. The shaft 32 has secured thereto one end of a coil spring 36, the other end of which is secured to the backing plate as indicated at 38. This spring serves to return the shaft 32 to its normal position after actuation of the brake.

As shown, the cam 34 has corresponding and oppositely arranged cam faces 40 and 42 adaptable for engagement with the shoulders 24 and 26 on the respective friction members and arranged intermediate the cam faces 40 and 42 is a groove or channel 44. This groove is so arranged with relation to the cam that the distance of the groove from the axis of the cam increases in proportion to the angular movement of the cam. The groove 44 terminates in a recess 46 in which is positioned a semi-spherical member 48 to which is secured one end of an operating cable 50. This operating cable is positioned in the groove 44 and extends through a suitable opening in the backing plate 10, so that it may be readily connected to a control element, not shown.

It will be observed that when force is applied to the cable, the cam will be operated to provide a quick take-up with but little movement of the cable and that by reason of the relation of the groove 44 to the axis of the cam, an increase in the leverage is provided when most needed in the operation of the friction elements.

It is to be observed that by reason of the pivotal connection of the yoke or support 30 and the rotatable and reciprocal characteristics of the shaft 32, the operating cam 34 is free to assume a proper relation with respect to the friction elements.

Positioned on the backing plate is a suitable adjustable stop 52 and connecting the friction elements to the backing plate are return springs 54. These springs serve to return the friction elements to the off position and to retain them against the stop 52 and cam in proper spaced relation to the drum.

In operation, when force is applied to the operating cable, the cam 34 is rotated to actuate the friction elements into drum engagement. By reason of the oppositely disposed relation of the faces of the cams, the friction elements are actuated with a balanced action and due to the relation of the groove positioned between the cam surfaces to the axis of the cam, an increase in leverage is obtained in proportion to the angular movement of the cam, so that the friction elements may be applied with equalized pressure and an increase in the leverage when the pressure is most needed.

Upon release of the applied force on the operating cable, the spring 36 serves to return the operating cam to its normal position. This spring is of such structure that it will permit slight reciprocation of the shaft on which the cam is mounted, so that the cam may readily move in proper position with relation to the friction elements.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a friction element having separable ends, a pivoted yoke, a member rotatably supported by the yoke about an axis extending along a chord of the brake, oppositely arranged cam surfaces on the member engaging the respective separable ends of the friction member, and means for operating the member so constructed and so arranged with respect to the support of the member by the yoke as to increase the leverage of the member during its rotation.

2. A brake comprising a friction element having separable ends, a pivotal yoke, and applying means for the friction element including a member supported by the yoke for rotation and reciprocation between the separable ends about an axis extending along a chord of the brake, the member having oppositely arranged cam faces engaging the respective separable ends, said applying means including parts so constructed and so arranged with respect to each other as to increase the leverage of the applying means as said member is rotated.

3. A brake comprising a backing plate, a friction element positioned on the backing plate, said friction element having separable ends, a yoke pivoted on the backing plate, a shaft supported for rotation and reciprocation by the yoke, a member keyed on the shaft having oppositely arranged cam faces engaging the respective separable ends and having a peripheral leverage-varying cam surface, and an operating element acting on said member and engaging said peripheral cam surface.

4. A brake comprising a backing plate, a friction element positioned for movement on the backing plate having separable ends, a yoke pivoted on the backing plate, a shaft supported for rotation and reciprocation on the yoke, a return spring for the shaft, a member secured to the shaft having oppositely arranged cam surfaces engaging the respective separable ends and having leverage-varying means variably spaced from the axis of rotation of said member, and an operating element acting on said member and engaging said means.

5. A brake comprising a fixed support, a rotatable drum associated therewith, a friction element positioned for movement on the backing plate adaptable for co-operation with the drum, the friction element having separable ends, a yoke pivoted on the fixed support, a shaft supported for rotation and reciprocation on the yoke, a return spring having one end connected to the shaft and its other end connected to the fixed support, a member keyed to the shaft having oppositely arranged cam surfaces engaging the respective separable ends, said member having a groove positioned between the cam surfaces and an operating cable positioned in the groove.

6. A brake comprising a fixed support, a rotatable drum associated therewith, a friction element positioned for movement on the support adaptable for cooperation with the drum, the friction element having separable ends, a yoke pivoted on the fixed support, a shaft supported for rotation and reciprocation on the yoke, a return spring for the shaft, a member secured to the shaft having oppositely arranged cam faces engaging the separable ends of the friction element and a face on the member variably spaced from the axis of rotation of said member, and an operating device acting on said member and engaging said face for increasing the leverage on the member proportionate to the angular movement thereof.

7. An applying device for a brake or the like comprising a rotatable member having spiral cams on its opposite ends, and having means determining its axis of rotation and provided about its center with means for engaging a rotation-producing element at a varying radius from said axis of rotation of said member so that uniform action of said means gives a varying rate of rotation.

8. An applying device for a brake or the like comprising a rotatable member having spiral cams on its opposite ends and having a peripheral cam groove between said ends.

9. An applying device for a brake or the like comprising a rotatable member having spiral cams on its opposite ends, and having means determining its axis of rotation and provided about its center means for engaging a rotation-producing element at a varying radius from the axis of said member so that uniform action of said means gives a varying rate of rotation, together with a movable support for said member permitting it to shift to balance the thrust at the two ends.

10. An applying device for a brake or the like comprising a rotatable member having spiral cams on its opposite ends and rotation-producing means between said ends, together with a movable support for said member permitting it to shift to balance the thrust at the two ends.

EUGENE V. TAYLOR.